United States Patent [19]
Weichel

[11] Patent Number: 5,996,340
[45] Date of Patent: Dec. 7, 1999

[54] TORQUE CONVERTER

[75] Inventor: Detlev Weichel, Schweinfurt, Germany

[73] Assignee: Mannesmann Sachs AG, Schweinfurt, Germany

[21] Appl. No.: 09/185,916

[22] Filed: Nov. 4, 1998

[30] Foreign Application Priority Data

Nov. 4, 1997 [DE] Germany .............................. 197 48 683

[51] Int. Cl.⁶ .................................................. F16D 33/00
[52] U.S. Cl. ........................................ 60/345; 416/197 C
[58] Field of Search .................. 60/330, 345; 415/215.1, 415/187.1; 416/197 C, 180

[56] References Cited

U.S. PATENT DOCUMENTS

| | | | |
|---|---|---|---|
| 4,534,456 | 8/1985 | Slezak | .................................. 60/330 X |
| 4,704,864 | 11/1987 | Frotschner et al. | ........................ 60/330 |
| 5,771,691 | 6/1998 | Kirkwood et al. | ........................ 60/345 |
| 5,881,556 | 3/1999 | Matsuoka | .............................. 60/345 X |

*Primary Examiner*—Hoang Nguyen
*Attorney, Agent, or Firm*—Cohen, Pontani, Lieberman & Pavane

[57] ABSTRACT

A torque converter comprises a converter housing that has a plurality of connection areas on one axial side. The converter housing is connectable in rotation-proof fashion relative to a crank shaft at connection points located in the connection areas. The converter housing has a plurality of radially extending hollows arranged in the circumferential direction at a distance from each other on the aforementioned axial side. A first distance between one of the hollows and the hollow directly adjacent to it in one circumferential direction is different from a second distance between the one of the hollows and the hollow directly adjacent to it in the other opposing circumferential direction.

26 Claims, 6 Drawing Sheets

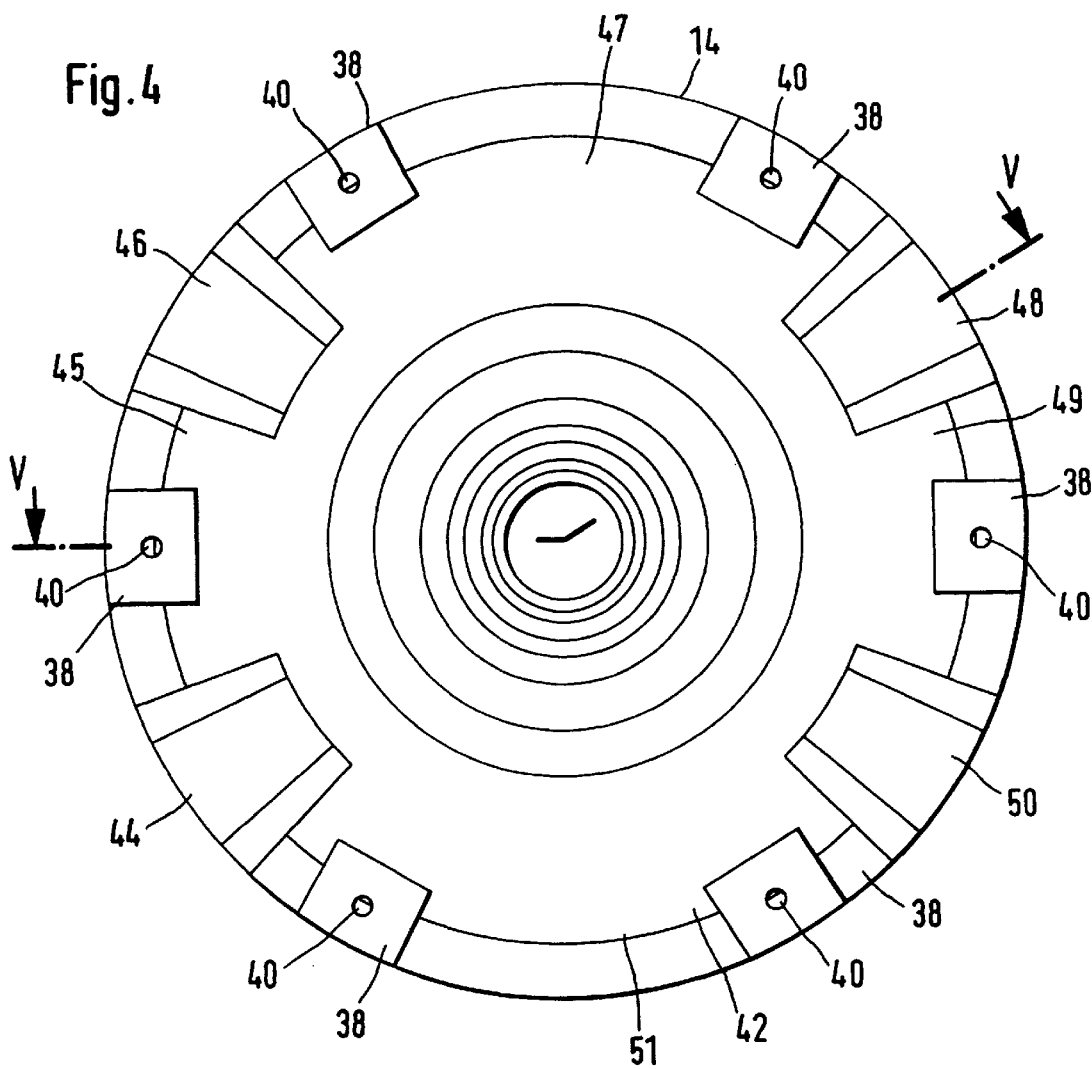
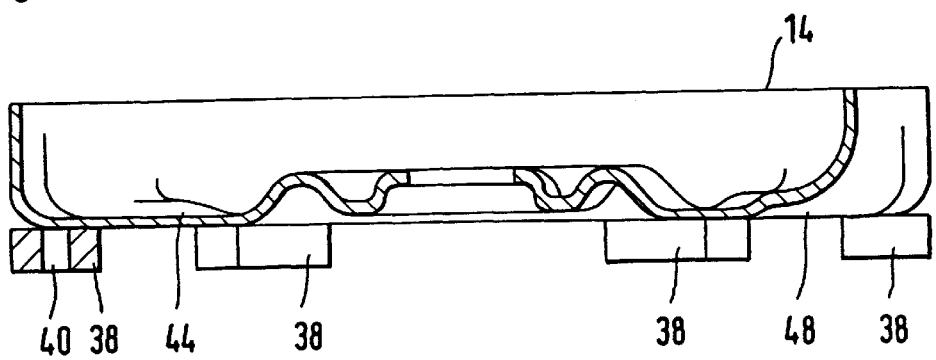

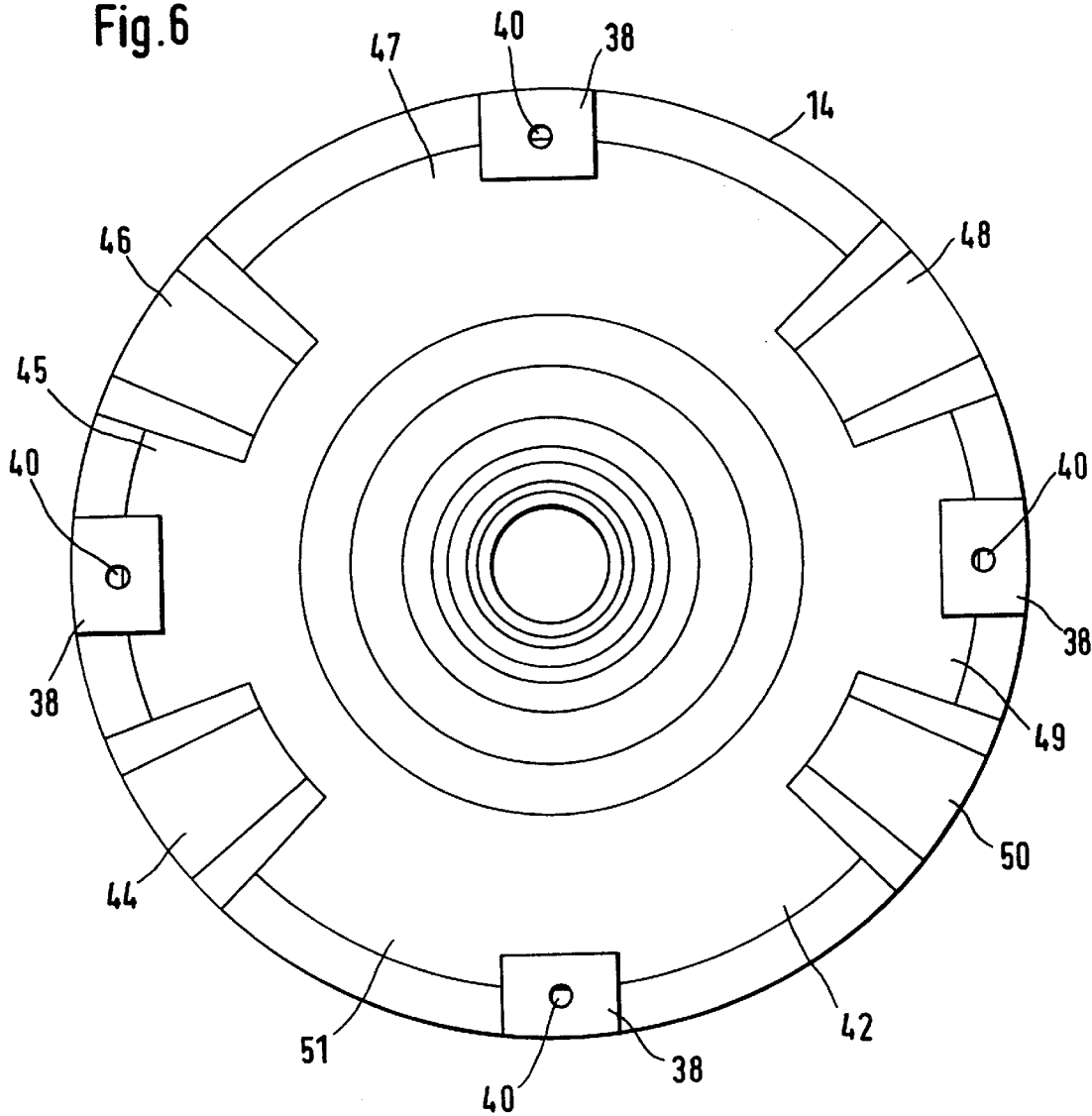

TORQUE CONVERTER

BACKGROUND OF THE INVENTION

1. Field of the Invention

The present invention relates to a torque converter for arrangement in a motor vehicle between an internal combustion engine and an automatic transmission, including a converter housing that has a plurality of connection areas on one axial side of the converter housing. The converter housing is connectable in a rotation-proof fashion to a crank shaft or to a component securely attached or attachable thereto by coupling elements positioned in the connection areas. The connector housing also includes and a plurality of substantially radially extending hollows arranged at a distance from each other in the circumferential direction.

2. Description of the Related Art

In the type of torque converters that are the subject of the present invention, a converter housing is connectable to a crank shaft of an internal combustion engine or to a flex plate or other component connectable with the crank shaft, and also carries a pump wheel. A turbine wheel is arranged inside the converter housing so as to be rotatable relative to the pump wheel. The converter housing also forms a fluid space in which a working fluid is held. The working fluid transmits torque between the pump wheel and the turbine wheel.

During operation of this type of torque converter, very great pressures of the working fluid are produced. Therefore, care must be taken to ensure that the converter housing is not deformed by the working fluid overpressure exerted on it from the inside. Furthermore, in constructing the converter housing, it is important to ensure that coupling elements are attached to the converter housing on the axial side on which the torque converter is to be connected to the crank shaft. Torque converters according to the prior art have converter housings with hollows extending radially outward from the radial inside on the axial sides of the converter housing intended for connection to the internal combustion engine. The hollows are arranged symmetrically relative to the rotational axis to allow the thinnest possible metal sheets to be used in manufacturing the torque converter housing. Generally, there are six hollows which run from a radially inner area to a radially outer area of the converter housing at an angular distance of 60° to each other. These hollows ensure sufficient rigidity of the converter housing when relatively thin materials are used. For connecting to the crank shaft or to a flex plate or other component attached in rotation-proof manner to the crank shaft, coupling elements are welded to the converter housing, for example, in the areas between the individual hollows. The coupling elements have threaded openings. Screw bolts that penetrate corresponding openings in the crank shaft or other component are threaded into the threaded opening of the coupling elements.

A problem with the prior art converter housings is that because there are, for example, six hollows, a like number of coupling elements must be provided and then connected to the converter housing either in the areas between the individual hollows or directly in the hollows themselves. To guarantee true running, the coupling elements attached to the converter housing must be distributed symmetrically. When six hollows are provided, the single alternative is to provide three coupling elements at an angular distance of 120°. However, when three coupling elements are provided, the forces that result from torque transmission in the areas where the individual coupling elements are attached to the converter housing become very large and may lead to deformation of the converter housing.

SUMMARY OF THE INVENTION

The object of the present invention is to provide a torque converter that permits a large number of connection and/or coupling arrangements for connecting the torque converter to a crank shaft of an internal combustion engine.

According to the invention, this object is attained by a torque converter having a converter housing that has a plurality of connection areas on one axial side in which the converter housing is connectable in rotation-proof fashion to a crank shaft or a component securely attached or attachable thereto. The converter housing, on the aforementioned axial side, has a plurality of hollows arranged at a distance from each other and extending substantially radially.

In the torque converter according to the invention, a first distance from at least one of the hollows to the hollow directly adjacent to it in one circumferential direction is different than a second distance from at least one of the hollows to another hollow directly adjacent to it in the opposite circumferential direction.

In the torque converter according to the invention, the hollows are thus arranged with non-uniform distances between them. Therefore, the torque converter may be connected to crank shafts or flex plates of different types, for example, by attaching coupling elements to the converter housing. There is no need to ensure any special symmetry of the hollows. Nonetheless, providing the hollows prevents distention of the converter housing under pressure from the working fluid even when relatively thin sheet metal materials are used.

It should be noted that the term "hollow" used in the claims and description encompasses axially offset areas that constitute hollows when seen from the converter exterior, being recessed toward the converter interior, as well as axially offset areas that constitute hollows when seen from the side facing the converter interior, being recessed toward the converter exterior. The term "hollow" as used here thus refers generally to approximately axially offset areas that, seen from the exterior, represent areas recessed toward the converter interior or, seen from the converter interior, represent areas recessed toward the converter exterior.

The hollows may, for example, be arranged such that the hollows are positioned substantially mirror-symmetrically relative to a mirror line located orthogonally to a rotational axis.

In an embodiment that permits the torque converter according to the invention to be adjusted in many different ways to different crank shafts or flex plates or the like, the hollows are positioned so that the distance from a first hollow to a directly adjacent hollow in one circumferential direction is approximately a whole-number multiple of the distance from the first hollow to another directly adjacent hollow in the other circumferential direction.

For example, the distance to the directly adjacent hollow in one circumferential direction may be approximately 120°, while the distance to the directly adjacent hollow in the other circumferential direction may be approximately 60°.

A converter housing that has sufficient rigidity and offers an adequate number of different possible attachment arrangements may be obtained by providing four hollows, each of which has a distance in the area of 120° to the hollow directly adjacent in one circumferential direction and a distance in the area of 60° to the hollow directly adjacent in the other circumferential direction.

The distance between hollows is an angular distance between the center lines of the given hollows, for example, which center lines extend substantially radially.

It is possible, while maintaining sufficient rigidity of the converter housing, to increase the number of possible arrangements for connecting the torque converter according to the invention to a crank shaft by embodying the hollows substantially in a radially outer area of one axial side.

Preferably, each of the respective connection areas is located between two directly adjacent hollows.

In an embodiment of the present invention, at least one coupling section for connecting the converter housing to a crank shaft or components attached or attachable securely to the crankshaft may be arranged, for example, in at least one connection area arranged between two hollows having a smaller distance between them and at least another coupling section may be arranged in at least one connection area between two hollows having a greater distance between them.

In a further embodiment, at least two coupling sections between two hollows having a greater distance between them are provided in at least one connection area.

Each coupling section may, for example, comprise a coupling element securely attached or attachable to the converter housing, preferably by welding.

Alternatively, a coupling ring designed for secure connection to the crank shaft or the component attached or attachable securely thereto, preferably by welding, may be attached to each coupling section.

The hollows, viewed from an exterior side of the converter housing, may be concave.

The invention also relates to a cover for a converter housing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 4 shows the cover in FIG. 2 with six attached coupling elements;

FIG. 5 is a side view of the cover in FIG. 4 along line V—V;

FIG. 6 shows an embodiment of the cover in FIG. 2 with four attached coupling elements;

DETAILED DESCRIPTION OF THE PRESENTLY PREFERRED EMBODIMENTS

Figure 1:
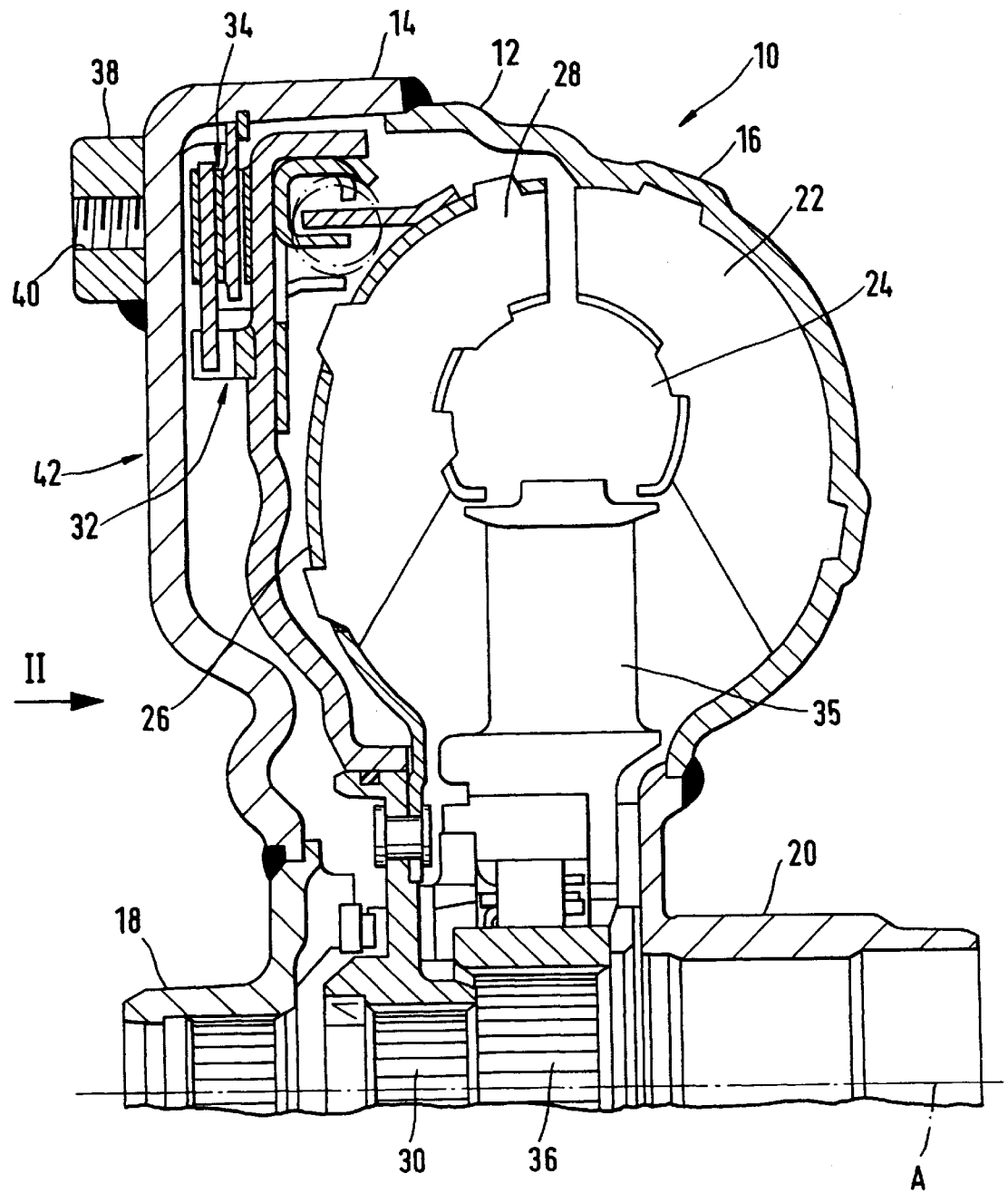
FIG. 1 is a partial longitudinal sectional view of a torque converter according to an embodiment of the present invention.

A torque converter 10 according to the present invention is shown in FIG. 1 with a converter housing 12 including a cover 14 and a pump shell 16 securely connected by welding. The cover 14 and the pump shell 16 are securely connected to respective hubs 18, 20. The pump shell 16 carries a plurality of pump blades 22. A turbine wheel 26 is rotatably arranged in the interior 24 of the converter housing 12 for rotation relative to the converter housing 12. The turbine wheel 26 carries a plurality of turbine blades 28 and is securely connected in a radially inner area to a turbine hub 30. The turbine wheel 26 may be optionally connected to the converter housing 12 via a torsional vibration damper 32 and a bridge coupling 34. A guide wheel 35 mounted via a free-wheel mechanism on a guide wheel hub 36 is arranged between the turbine wheel 26 and the pump shell 16 of the converter housing 12.

Several coupling elements 38 are circumferentially distributed and attached to the cover 14 of the converter housing 12 (only one coupling element is shown in FIG. 1). Generally, the coupling elements 38 are metal blocks that have an internal threaded opening 40 extending substantially parallel to a rotational axis A. The coupling elements 38 are also welded to the cover 14 on a side 42 of the converter housing 12 or the cover 14 facing the internal combustion engine. The multiple coupling elements 38 connect the converter housing 12 to a crank shaft (not shown) of an internal combustion engine. In addition, a so-called flex plate or other component, for example, may be attached intermediate the cover and the crank shaft. The flex plate or other component, has openings through which bolts screwed into the threaded openings 40 pass for connecting the converter housing 12 to the crank shaft in a rotation-proof manner.

Figure 2:
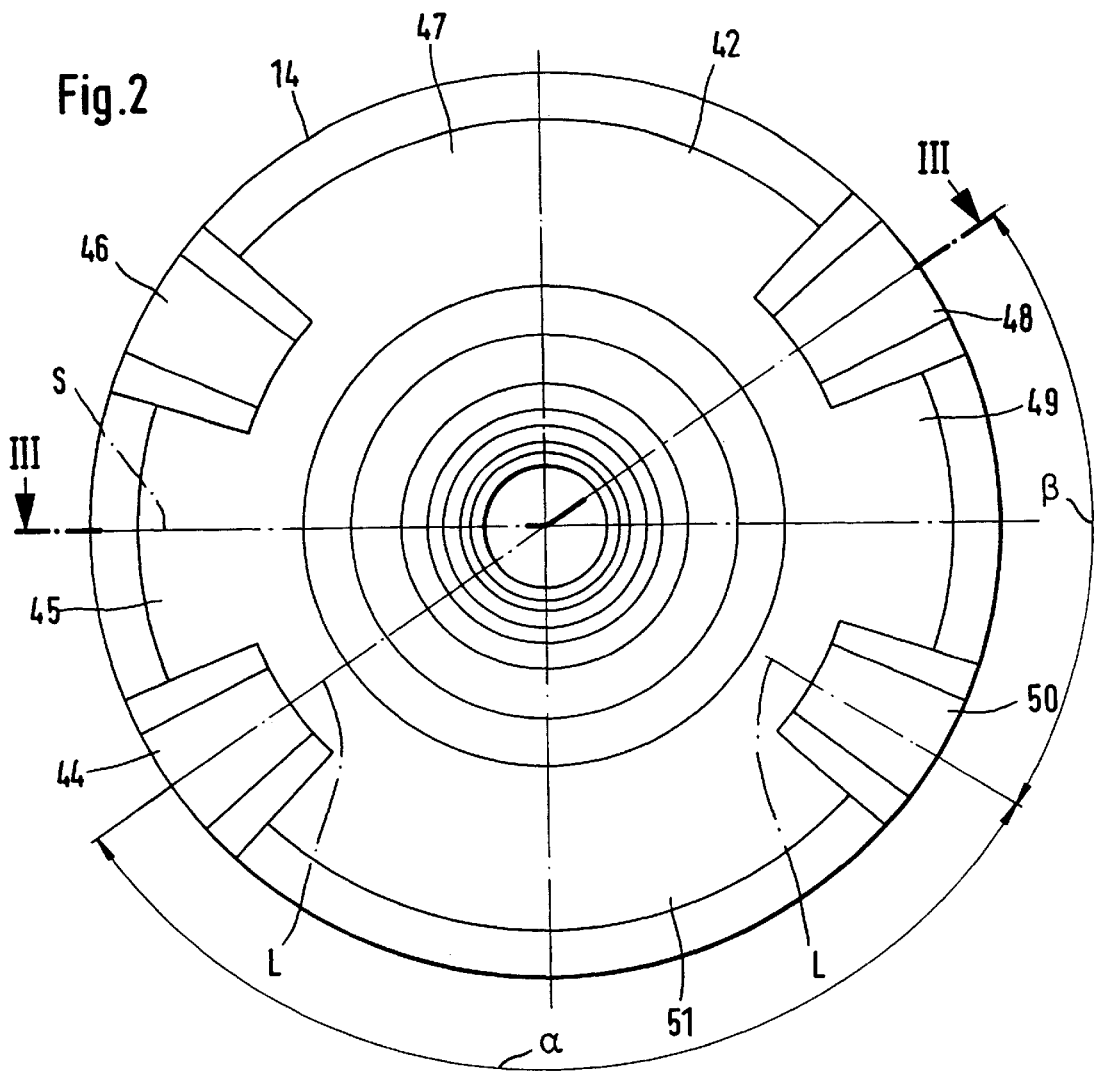
FIG. 2 is a view of a cover for the converter housing viewed along the direction II of the torque converter in FIG. 1.
Figure 3:
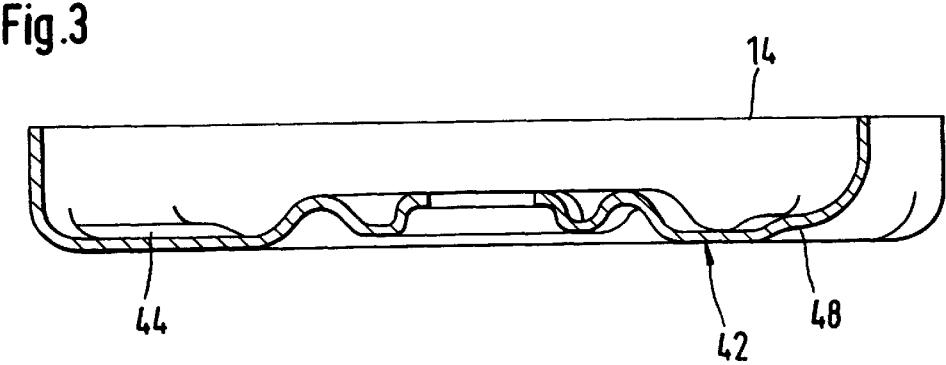
FIG. 3 is a side view of the cover in FIG. 2 along line III—III.

FIGS. 2 and 3 show the cover 14 of the converter housing 12 in top view and side view, respectively. A plurality of hollows 44, 46, 48, 50 are arranged on the side 42 of the cover 14 facing the internal combustion engine. The hollows 44, 46, 48, 50 extend radially inward from the radial outside substantially along longitudinal center lines L to a predetermined extent and end in a radially central area or after approximately ⅓ of the radial extension of the cover 14. The hollows 44, 46, 48, 50, viewed along direction II in FIG. 1, are, for example, concave hollows directed toward the interior space 24 of the converter housing 12. The hollows 44, 46, 48, 50 increase the stability of the converter housing 12 against distention. Due to the relatively high pressure that the working fluid in the interior space 24 exerts in the torque converter 10, the danger exists that when relatively thin materials, such as sheet metal materials, are used for the converter housing 12, a portion of the converter housing such as the cover 14 will become outwardly distended. This can lead to problems, particularly in the radially inner area, where the cover runs in a rotatable fashion. Stability against distension is facilitated by providing the hollows 44, 46, 48, 50 in the cover 14.

FIGS. 2 and 3 also show that the hollows 44, 46, 48, 50 are arranged at different angular distances from one another. In the case of the hollow 50, for example, the angular distance $\alpha$ between the longitudinal center line L of the hollow 50 and the hollow 44 directly adjacent circumferentially in the clockwise direction is 120°. In the opposite direction, i.e., the counterclockwise direction, the angular distance β to the directly adjacent hollow 48 is 60°. It can be seen that this non-uniform distance applies for all hollows 44, 46, 48, 50. In other words, each of the hollows 44, 46, 48, 50 has two directly adjacent hollows, i.e., one hollow in each circumferential direction, whereby the distance to the hollow in one circumferential direction is different from the distance to the hollow in the other circumferential direction. In this particular arrangement, the hollows are positioned in a mirror-symmetrical manner relative to a mirror line S. That is, the hollow 44 and the hollow 46 are arranged mirror-symmetrically relative to the mirror line S, while the hollows 50 and 48 are also arranged mirror-symmetrically relative to the extended mirror line S. Located between the respective hollows 44, 46, 48, 50 are the respective connection areas 45, 47, 49, 51, in which, in the manner described below, the coupling elements 38 are arranged to form the respective coupling sections.

This embodiment of the cover 14 of the converter housing 12 exhibits sufficient reinforcement of the converter housing 12 while simultaneously increasing the number of possible connection arrangements for connecting a torque converter equipped with such a converter housing 12 to a crank shaft or other component compared with known solutions in which the individual hollows are arranged at uniform distances. This increase in the number of possible connection arrangements is explained below with reference to FIGS. 4 through 10.

FIGS. 4 and 5 show six coupling elements 38 attached to the cover 14 by welding. To guarantee true running, the coupling elements 38 are arranged at uniform angular distances of 60° from each other. FIG. 4 shows that in the respective connection areas 47, 51 located between the hollows 46, 48 and 50, 44, which are at a greater distance from each other, two coupling elements 38 are arranged to form two coupling sections. In contrast, in the respective connection 20 areas 45, 49 located between the hollows 44, 46 or 48, 50, which are at a lesser distance from each other, one coupling element 38 is arranged to form one coupling section. The provision of six coupling elements 38 ensures that the transmitted forces are distributed evenly to the entire circumference of the cover 14 so that load concentrations are avoided even when relatively large torques are transmitted.

FIG. 6 shows an arrangement with four coupling elements 38 on the same cover 14, whereby directly adjacent coupling elements 38 have an angular distance of 90° to each other. Here, too, there is symmetrical positioning of the coupling elements 38 around the rotational axis, so that true running is again ensured. In this arrangement, a coupling element 38 is provided between the directly adjacent hollows 44, 50 and 46, 48 at a lesser distance from each other, and a coupling element 38 is also provided between the hollows 44, 46 and 48, 50 at a greater distance from each other.

In the arrangement shown in FIG. 6, a coupling element 38 is thus provided in the connection areas 45, 49 with lesser circumferential extension as well as in the connection areas 47, 51 with greater circumferential extension so as to form, in each case, one coupling section. The provision of four coupling elements 38 at uniform circumferential distances also ensures an adequate distribution of the forces exerted on the converter housing 12 during torque transmission without local overloads thereby occurring on the converter housing 12.

It can thus be seen that the positioning of the hollows 44, 46, 48, 50 at irregular distances to each other increases the positioning possibilities for the coupling elements 38 thereby increasing the number of possible connection arrangements for connecting the torque converter cover 14 to the crank shaft. One torque converter 10 equipped with a cover 14 according to the invention may be connected to many differently constructed crank shafts, flex disks or other components. It is simply necessary to secure the coupling elements 38 to the suitable positions.

Figure 7:
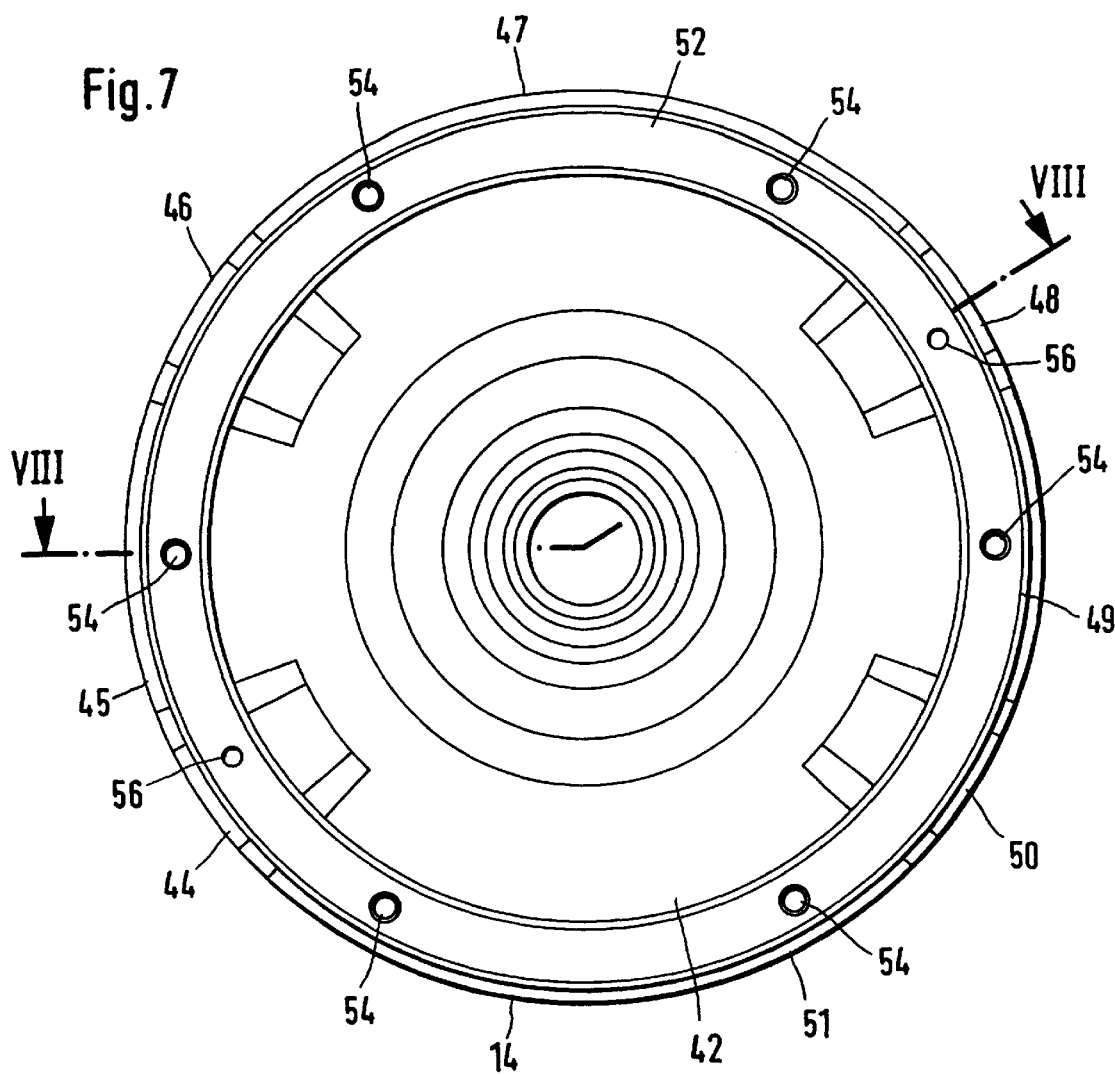
FIG. 7 shows another embodiment of the cover in FIG. 2 with an attached ring element.
Figure 8:
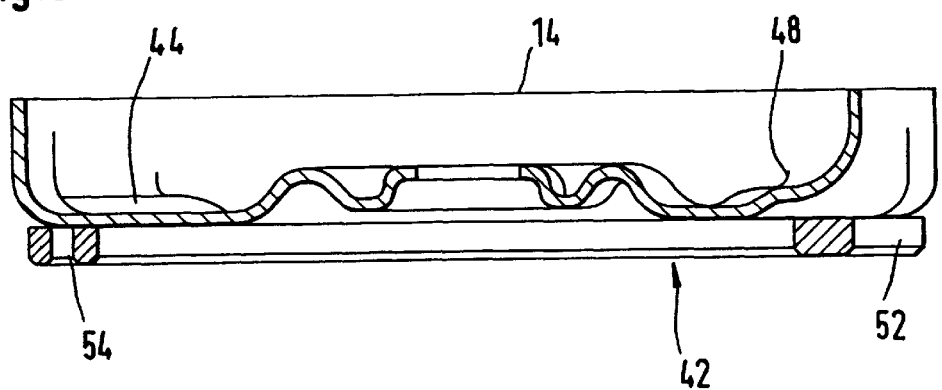
FIG. 8 is a sectional view of the cover in FIG. 7 along line VII—VII.

FIGS. 7 and 8 show the connection of the cover 14 to a coupling ring 52. In the depicted embodiment, the coupling ring 52 is arranged in a radially outer area and has six threaded openings 54, into which screws or other threaded coupling devices may be inserted to secure the converter housing to a crank shaft or other components. When a coupling ring 52 is used, the arrangement of the hollows 44, 46, 48, 50 at non-uniform distances still permits many different connection arrangements of the coupling ring 52 to the cover 14. Thus, for the purpose of symmetrical force introduction or distribution to the converter housing 12, the ring 52 is welded to the cover 14, for example, at six points, whereby one weld point must be provided in the area of the connection areas 45, 49 with lesser circumferential extension and two weld areas or points must be provided in the area of the connection areas 47 and 51 with greater circumferential extension. In the same way, it is possible to provide one weld point in the circumferential central area of each of the connection areas 45, 47, 49, 51. In all cases, the plurality of weld points which then define the respective coupling sections are selected in keeping with the established operating requirements, without being limited by the positioning of the individual hollows 44, 46, 48, 50.

It should also be noted that in FIG. 7, in the area of the hollows 44, 48, a positioning boring 56 is optionally embodied in the coupling ring 52 to accommodate adjustment pins.

Moreover, the coupling ring 52 may also be welded to the cover 14 along longer circumferential extension areas or even along the entire circumferential extension of the individual areas 45, 47, 49, 51.

Figure 9:
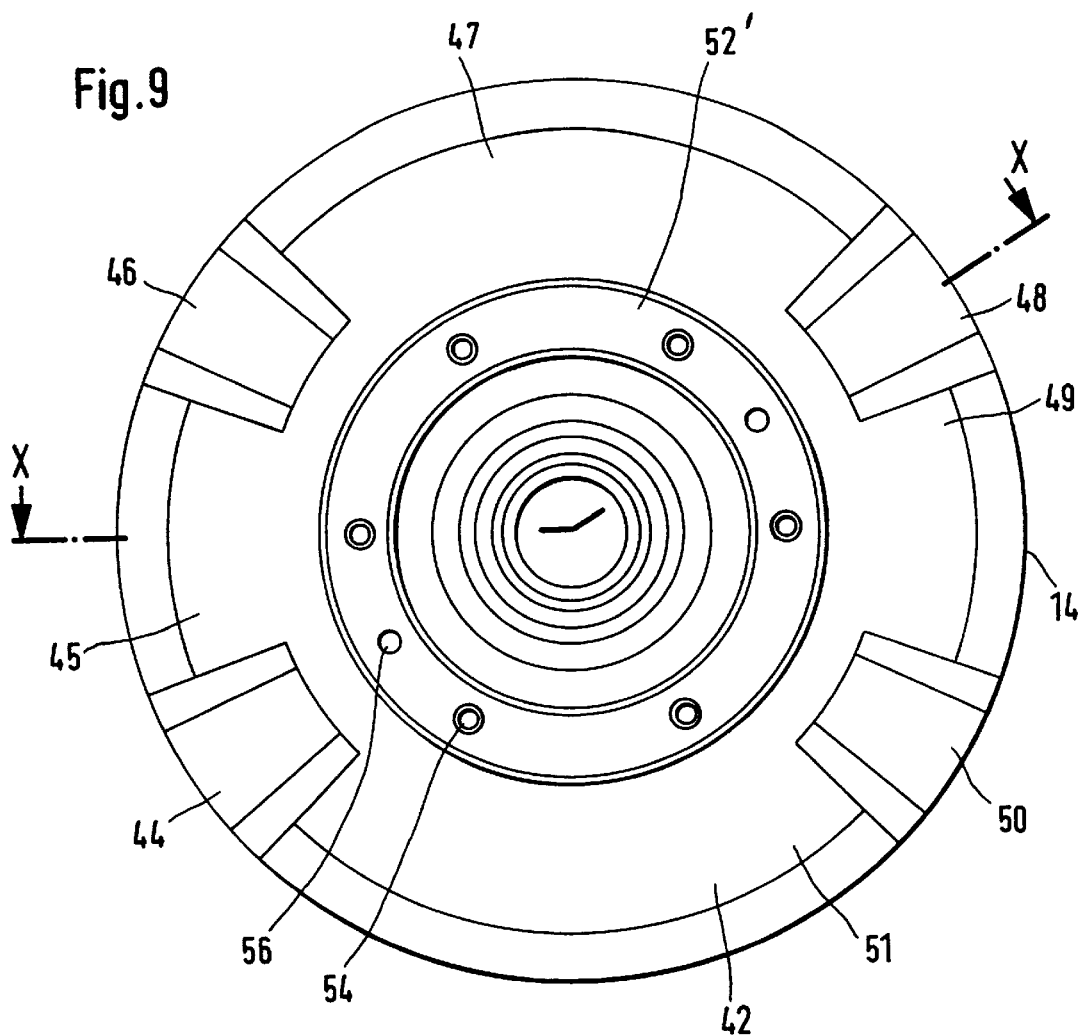
FIG. 9 shows yet another embodiment of the cover in FIG. 2 with another ring element.
Figure 10:
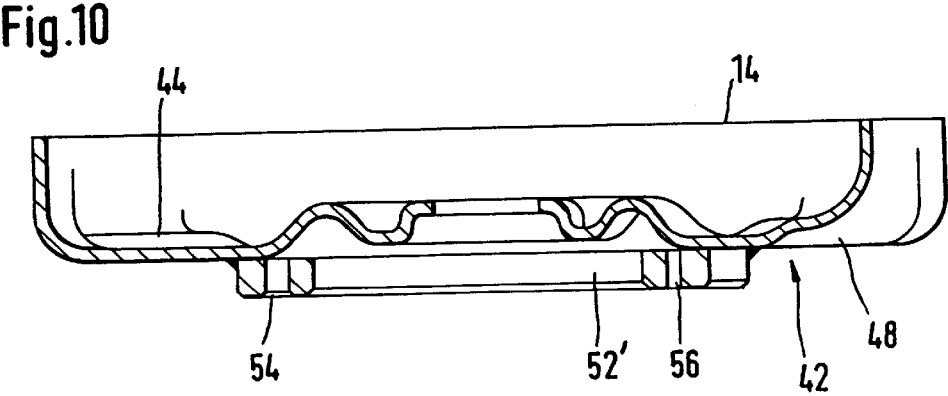
FIG. 10 is a side view of the cover in FIG. 9 along line X—X.

FIGS. 9 and 10 show a further embodiment attaching a coupling ring 52' to the cover 14. In this embodiment, the coupling ring 52' with its threaded openings 54 or positioning borings 56 lies radially inside the hollows 44, 46, 48, 50, and there it is welded to the cover 14 either along its entire circumference or at points or in areas. Because the hollows 44, 46, 48, 50 are embodied only in a radially outer area of the cover 14, a sufficiently great number of coupling sections for connecting the coupling ring 52' with the smaller diameter to the cover 14 may also be provided.

By arranging hollows at irregular circumferential distances to each other, it is thus possible, as described above, to use a torque converter in connection with a variety of different crank shafts or flex plates or other components, because the respective coupling elements or coupling sections are attachable to the converter housing or cover where required by the structural features of the crank shaft without being substantially limited by the positioning of the hollows.

The hollows provided in the converter housing according to the invention increase the rigidity of the converter housing in the area of the cover for counteracting the above-described distention. The limited radial extension of the hollows in the radially outer area provides sufficient housing rigidity while simultaneously permitting completely unimpaired connection in the radial inner area of hollows with a coupling ring or coupling elements.

The positions of the individual hollows shown in the drawings and described above are only illustrative. Other angular distances may be provided between the individual hollows, for example, or that more or fewer hollows, for example, two or three or four or five hollows, arranged at different circumferential distances may be provided. It is also possible, for example, for three directly consecutive hollows to be arranged at uniform distances to each other and for a further hollow to then have different distances to its directly adjacent hollows.

It should again be pointed out that although the hollows shown in the drawings constitute hollows when seen from the converter exterior and form recessed areas axially relative to the converter interior, it is also possible for hollows to be provided in the converter cover axially relative to the exterior, i.e., recessed toward the internal combustion engine. These hollows then constitute hollows when seen from the converter interior, and when seen from the converter exterior form bulges. The above-described function of stabilizing the converter housing or the converter cover can be attained regardless of the direction, starting from a base level of the converter cover, in which the hollows are formed.

The invention is not limited by the embodiments described above which are presented as examples only but can be modified in various ways within the scope of protection defined by the appended patent claims.

I claim:

1. A torque converter for arrangement between an engine and a transmission of a motor vehicle, comprising:
    a pump wheel rotatable about an axis of rotation;
    a turbine wheel rotatable relative to said pump wheel about said axis of rotation; and
    a converter housing connected to said pump wheel and defining an interior space for receiving a working fluid used for transferring torsional forces between said pump wheel and said turbine wheel;
    wherein said converter housing includes a plurality of radially extending hollows arranged at circumferential distances from one another on one axial side of said converter housing and a plurality of connection areas on said one axial side, said converter housing being rotatably fixedly connectable relative to a crankshaft of the engine at said plural connection areas, and
    wherein a first circumferential distance from one of said plural hollows to an adjacent one of said plural hollows in a first circumferential direction is greater than a second circumferential distance from said one of said plural hollows to another adjacent one of said plural hollows in a second circumferential direction opposite said first circumferential direction.

2. The torque converter of claim 1, wherein said plural hollows are positioned substantially mirror-symmetrically relative to a mirror line located orthogonal to said axis of rotational.

3. The torque converter of claim 1, wherein said first circumferential distance is approximately a whole-number multiple of said second circumferential distance.

4. The torque converter of claim 3, wherein said first circumferential distance comprises approximately 120° and said second circumferential distance to comprises approximately 60°.

5. The torque converter of claim 1, wherein said plural hollows comprise four hollows, said first circumferential distance of each of said four hollows comprising approximately 120° to an adjacent one of the four hollows in one circumferential direction and said second circumferential distance of each of said four hollows comprising approximately 60° to another adjacent hollow another circumferential direction.

6. The torque converter of claim 1, wherein said first circumferential distance and said second circumferential distance comprise angular distances between substantially radially extending center lines of respective ones of said plural hollows.

7. The torque converter of claim 1, wherein said plural hollows are arranged on a radially outer area of said one axial side.

8. The torque converter of claim 1, wherein each said plural connection areas is operatively arranged between a circumferentially adjacent pair of said plurality of hollows.

9. The torque converter of claim 8, further comprising at least one coupling section operatively arranged in at least one of said plural connection areas between two said plural hollows at said first circumferential distance from each other and at least another coupling section operatively arranged in at least one of said plural connection areas between two said plural hollows at said second circumferential distance from each other for connecting said converter housing relative to said crank shaft.

10. The torque converter of claim 9, wherein at least two coupling sections are operatively arranged in said at least one connection area between two said plural hollows at said first circumferential distance from each other.

11. The torque converter of claim 9, wherein each said at least one coupling section comprises a coupling element securely attachable to said converter housing.

12. The torque converter of claim 9, wherein said at least one coupling section comprises a coupling ring designed for secure connection to the crank shaft attached to each said at least one coupling section.

13. The torque converter of claim 1, wherein each said plural hollows comprises a concave recess relative to an exterior side of said converter housing.

14. A cover for a torque converter mountable about an axis of rotation of the torque converter, comprising:
    a plurality of radially extending hollows arranged at circumferential distances from one another on one axial side of said cover and a plurality of connection areas located on said one axial side, said cover being rotatably fixedly connectable relative to a crankshaft of the engine at said plural connection areas, and
    wherein a first circumferential distance from one of said plural hollows to an adjacent one of said plural hollows in a first circumferential direction is greater than a second circumferential distance from said one of said plural hollows to another adjacent one of said plural hollows in a second circumferential direction opposite said first circumferential direction.

15. The cover of claim 14, wherein said plural hollows are positioned substantially mirror-symmetrically relative to a mirror line located orthogonal to said axis of rotation.

16. The cover of claim 14, wherein said first circumferential distance is approximately a whole-number multiple of said second circumferential distance.

17. The cover of claim 16, wherein said first circumferential distance comprises approximately 120° and said second circumferential distance to comprises approximately 60°.

18. The cover of claim 14, wherein said plural hollows comprise four hollows, said first circumferential distance of each of said four hollows comprising approximately 120° to an adjacent one of the four hollows in one circumferential direction and said second circumferential distance of each of said four hollows comprising approximately 60° to another adjacent hollow in another second circumferential direction.

19. The cover of claim 14, wherein said first circumferential distance and said second circumferential distance comprise angular distances between substantially radially extending center lines of respective ones of said plural hollows.

20. The cover of claim 14, wherein said plural hollows are arranged on a radially outer area of said one axial side.

21. The cover of claim 14, wherein each said plural connection areas is operatively arranged between a circumferentially adjacent pair of said plurality of hollows.

22. The cover of claim 21, further comprising at least one coupling section operatively arranged in at least one of said plural connection areas between two said plural hollows at said first circumferential distance from each other and at least another coupling section operatively arranged in at least one of said plural connection areas between two said plural hollows at said second circumferential distance from each other for connecting said converter housing relative to said crank shaft.

23. The cover of claim 22, wherein at least two coupling sections are operatively arranged in said at least one connection area between two said plural hollows at said first circumferential distance from each.

24. The cover of claim 22, wherein each said at least one coupling section comprises a coupling element securely attachable to said converter housing.

25. The cover of claim 22, wherein said at least one coupling section comprises a coupling ring designed for secure connection to the crank shaft attached to each said at least one coupling section.

26. The cover of claim 14, wherein each said plural hollows comprises a concave recess relative to an exterior side of said converter housing.

* * * * *